United States Patent [19]

Watt

[11] 4,365,716
[45] Dec. 28, 1982

[54] PEELABLE SEAL

[75] Inventor: William E. R. Watt, Barto, Pa.

[73] Assignee: Pharmachem Corporation, Bethlehem, Pa.

[21] Appl. No.: 189,033

[22] Filed: Oct. 20, 1980

Related U.S. Application Data

[60] Division of Ser. No. 964,453, Nov. 29, 1978, Pat. No. 4,264,392, which is a continuation of Ser. No. 830,051, Sep. 2, 1977, Pat. No. 4,183,434.

[51] Int. Cl.³ .................. B32B 31/20; C09J 5/02
[52] U.S. Cl. ................... 206/632; 156/272.6; 156/275.1; 156/244.11; 156/244.24; 156/308.4; 156/344; 204/168; 206/633

[58] Field of Search .................... 156/69, 272.6, 275.1, 156/247, 244.11, 244.24, 289, 308.4, 344; 427/39, 40; 128/214 D, 272; 206/631, 632, 633; 204/168

[56] References Cited

U.S. PATENT DOCUMENTS

| | | | |
|---|---|---|---|
| 3,018,189 | 1/1962 | Traver | 427/328 |
| 3,067,119 | 12/1962 | Ramaika | 156/272.6 |
| 3,284,331 | 11/1966 | McBride et al. | 204/169 |
| 3,491,935 | 1/1970 | Trotter, Jr. et al. | 156/69 |
| 3,859,159 | 1/1975 | Carter et al. | 156/308.4 |
| 3,914,521 | 10/1975 | Beatty et al. | 156/272.6 |
| 3,924,748 | 12/1975 | Braverman | 206/631 |
| 4,112,989 | 9/1978 | Grode et al. | 128/214 D |

Primary Examiner—Michael G. Wityshyn
Attorney, Agent, or Firm—Austin R. Miller

[57] ABSTRACT

Containers for storing food, medicaments, blood, and the like having a peelable seal formed by sealing together an oxidized surface of a polyolefin film.

9 Claims, 6 Drawing Figures

PEELABLE SEAL

This is a division, of application Ser. No. 964,453, filed Nov. 29, 1978, now U.S. Pat. No. 4,264,392, which is a continuation of S. N. 830,051, filed Sept. 2, 1977, now U.S. Pat. No. 4,183,434.

BRIEF DESCRIPTION OF THE INVENTION

This invention relates to a peelable seal for use in connection with containers and to a process for producing the same.

Discussion of the Prior Art

It is well known in the art to utilize plastic bag containers in packaging because of their low cost and ease in manufacture. The plastic bag containers have found their use in packaging frozen foods, tobacco, hardware, medicaments articles of manufacture, as boilable cooking bags, and the like. At the present time, various methods are utilized to seal the container either at a time prior to filling so as to maintain its integrity or after filling with the desired product. The sealing of the container takes place by various methods such as weld sealing with heat and/or pressure utilizing various adhesives, etc. Such sealing of the container provides a disadvantage in that separation without tearing or particle formation is difficult and re-sealing when necessary is not possible in all cases without additional equipment or sealing components. There are many applications wherein a peelable seal on the container is most advantageous. Until now, only polyvinyl chloride film have been commercially utilized to form a container having a peelable seal of a plastic material. The utilization of the polyvinyl chloride has been found to be disadvantageous wherein human consumption of the product takes place due to the fact that there is a leaching out of certain chemicals from the film which are harmful when consumed by humans. Additionally, polyvinyl chloride has the disadvantage of requiring additional ingredients to form the seal or when opened leaves a residue about the peeled area which can cause contamination.

U.S. Pat. No. 3,081,214 to Thomas Henry Strome discloses the surface treatment of polyethylene with corona discharge in order to activate polyethylene film so as to provide a strong bond with inks having a nitrocellulose or polyamide base.

U.S. Pat. No. 3,360,412 to Albert L. James discloses a process for producing a heat seal lamination from a film of polyolefin material which has been pretreated with electrical corona discharge or an oxidizing gas flame. Under the conditions disclosed in this patent, a substrate web is heated to a temperature at least equal to the fusion temperature of the thermoplastic film so that there is formed a permanent bond.

U.S. Pat. No. 3,491,935 to Claude H. Trotter, Jr., et al discloses the formation of a peelable seal utilizing the principle of differential fusion between certain thermoplastic material by using heat input.

U.S. Pat. No. 3,914,521 to Theodore R. Beatty et al relates to a heat-treated, corona-treated polymer body having a surface susceptible to adhering to adhesives or the like in order to form a strong permanent bond. Thus, it is known in the art that subjecting a polymer film to a corona discharge using an energy of up to 1-4 watts-min/sq. ft., can increase the surface adhesion characteristics for the film. There is further shown a specimen of polypropylene film which was subjected to a corona treatment using a 2 kilowatt Union Carbide corona discharge device which was set to impart an energy density-to-film surface of 118 watts-min/sq. ft. to the film. The corona discharge lasted approximately ten seconds after which a scanning electron microscope was used to obtain a photomicrograph of the corona-treated film wherein the surface there was found to contain a definite gathering of crystals with distinct crevices formed between adjacent crystals.

It is known to produce a peelable seal on containers formed from plastic material by applying only a slight pressure during heat sealing. However, such prior art methods require precision and controlled heat sealing operations which prevent the commercialization of the method. Furthermore, such sealing is inconsistent and not reliable.

Although various methods have been made to provide a flexible plastic container with a peelable seal utilizing an inert plastic substance, none have resulted in a container which can be utilized both at a low temperature and a high temperature range.

Objects of the Invention

It is an object of the present invention to provide a container with a peelable seal which overcomes the disadvantages of the prior art, and which provides for an application together with non-plastic components of a container.

It is a further object of this invention to provide a container which utilizes a seal formed only of the containers' components and without the use of additional ingredients.

Summary of the Invention

The present invention relates to a method for treating a polyolefin film that is utilized in the formation of containers so as to render the container with a peelable seal. More particularly, the present invention relates to the treatment of a polyolefin film which in itself forms a container or where the polyolefin is utilized in combination with other materials such as other plastics or metal.

It has now been found that polyolefin can be made to form a peelable seal if at least one surface is oxidized by either an application of an open flame which is an oxidizing flame such as a propane flame or corona discharge under the conditions disclosed by R. M. Sonkin in "Corona-Discharge Treatment of Polyolefin Films", Plastics Engineering, Feb. 1977, pages 50-52 prior to heat sealing. According to the method of Sonkin, polyolefin film is passed over a dielectric-covered treater roll where it is exposed to a continuous plasma of ionized particles (corona) from an electrode. The corona treatment of the polymer results from the bombardment and penetration of these ions into the molecular structure at the surface of the material. It is believed that the oxidation and polar group formation in the surface molecules induces the rise in surface tension of the treated material. Thus, the corona treatment alters the film surface, principally by oxidation, to change the surface polarity, and consequently, the surface tension. The oxidized surface results in an interface which resists fusion of the film during controlled heat sealing. The interface is a result of the gathering of crystals or spherulites along the film surface as shown in U.S. Pat. No. 3,914,521. It is the presence of the interface which resists the formation of the fusion bond under the conditions set forth by the prior art for non-treated film. Heat sealing the treated polyolefin utilizing combined temperature and pressure conditions provides a complete seal which is not fusion bonded and is peelable. As the temperature and pressure conditions increase in the heat sealing operation, the bond increases in strength until there reaches a point that fusion occurs as contemplated by the prior art to form a weld seal.

The test to determine the presence of a suitable interface may be made pursuant to the wettability test set forth by A. J. G. Allen in "The Spreading of Liquids on Polyethylene Film: The Effect of Pre-Printing Treatments", 132nd National Meeting, A. C. S., New York, Sept. 8-13, 1957 (17 No. 2).

A peelable seal is formed when polyolefin films are heat sealed together under a controlled application of temperature and pressure with at least one of the surfaces between the films being oxidized. Generally, a treated polyolefin film having a surface energy of 30-50 dynes/cm. is subjected to a pressure of 500-1500 lbs/sq. in. of sealing area at a temperature of about 200°-500° F. The dwell time for the application of the pressure is well known in the art as noted in U.S. Pat. No. 3,491,935 of Trotter et al and is dependent upon factors such as film, thickness and peel strength desired. Prolonged application of pressure, higher temperatures and increased pressures would result in a weld seal. It is understood that the term "heat sealing" as used herein refers to the technique of sealing by the heat and pressure together.

The utilization of a polyolefin has been found to be very advantageous because of its inertness to various foods and chemicals. Furthermore, polyolefin containers are known to be capable of use as boilable containers and for storing frozen products.

Other objects and advantages of this invention will become further apparent hereinafter, and in the drawing of which:

DRAWINGS

DESCRIPTION OF THE PREFERRED EMBODIMENTS

Figure 1:
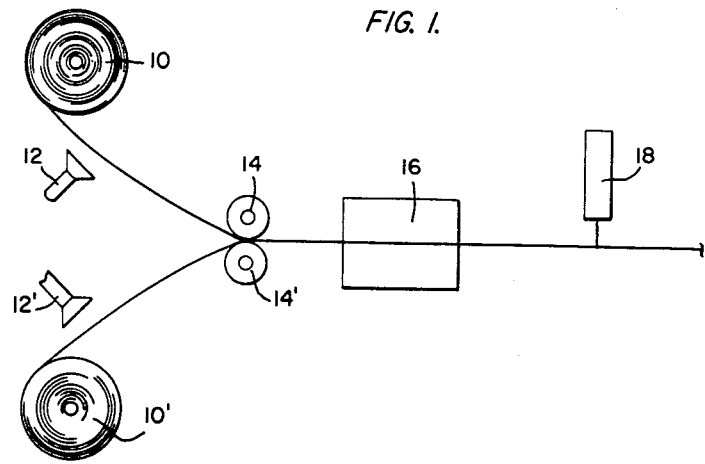
FIG. 1 is a diagrammatic representation of a process for producing a container with a peelable seal according to the present invention.

FIG. 1 illustrates one method of forming flexible containers with peelable seals in accordance with the present invention. Polyolefin film is fed from supply rolls 10, 10' and is oxidized on a surface being subjected to corona discharge by lamps 12, 12'. The treated films are then passed through rolls 14, 14' and into a platen press 16 wherein the sealing occurs utilizing selected temperatures and pressures which depends upon the particular density of the polyolefin utilized and the permanency of the seal. The individual containers are then cut from the rolls by means of a cutter 18.

In lieu of corona treatment, the surfaces of the polyolefin film may be oxidized utilizing an open flame. Typically, the treated polyolefin film has a surface energy of 30-50 dynes/cm. The sealing pressure by the platen press is generally 500-1500 lbs. per square inch of sealing area and at a temperature of about 200°-500° F. Besides the use of a platen press, forming rolls may be utilized in the conventional method of producing plastic containers. Also, it has been found to be advantageous to form the polyethylene containers utilizing impulse sealing techniques.

Figure 2:
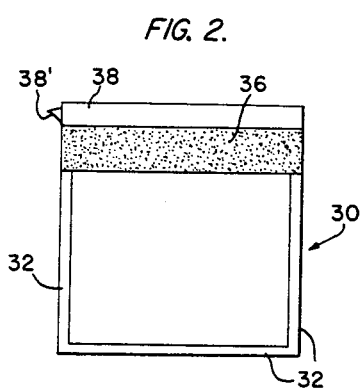
FIG. 2 illustrates a polyolefin bag containing a peelable seal on one side.

It can be readily seen that the treated polyolefin can be utilized to form containers having a wide variety of uses. As shown in FIG. 2, a polypropylene bag 30 is formed wherein there is a permanent seal 32 along the edge on three sides only with the remaining portion having a peelable seal 36 so that upon the application of a force by means of free end flaps or tabs 38, 38', the peelable seal 36 is peeled apart so as to form an access into the container. Such a container is suitable for use when the container's integrity is to be maintained prior to filling with an article such as food.

Figure 3:
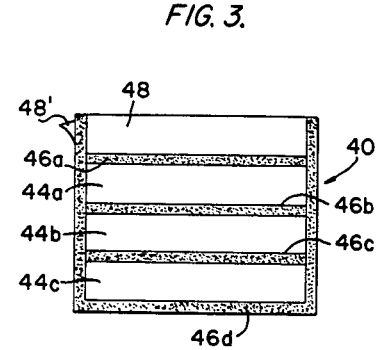
FIG. 3 illustrates a polyolefin bag containing several peelable portions of different strength.

In FIG. 3 there is shown a polyethylene container 40 which is provided with a plurality of compartments 44a, 44b, 44c that are formed by means of seals 46a, 46b, 46c, 46d. Each of the seals 46a, 46b, 46c, 46d has a different peel strength. There is further provided free ends 48, 48' which serve as gripping means for peeling apart the seal 46a. Container 40 is especially adaptable for utilization as a mixing bag wherein the contents of the container are to be kept separated and mixed only prior to use, such as in the case with epoxy cements.

Figure 4:
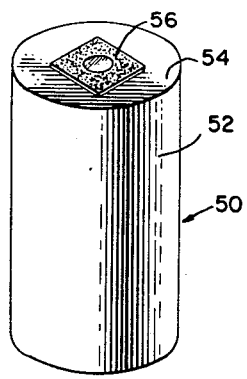
FIG. 4 illustrates the application of the present invention to a container formed in combination with other materials.

FIG. 4 shows the utilization of a peelable seal 56 in connection with a metallic can 50 having a metallic body portion 52 and a treated polyethylene lid 54.

Figure 5:
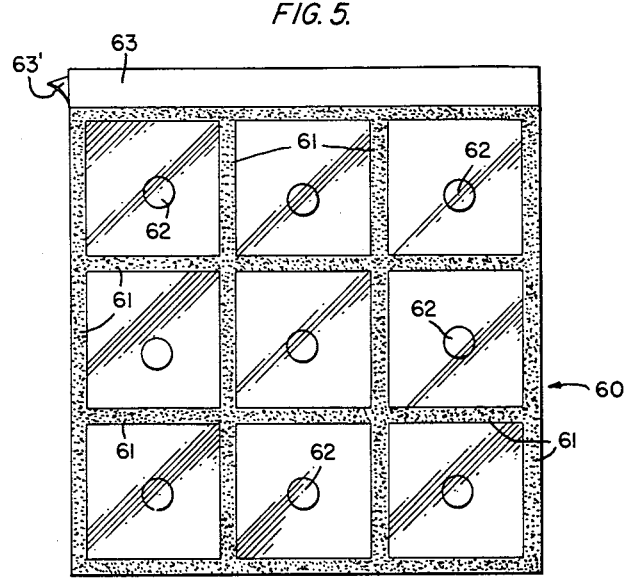
FIG. 5 illustrates the application of the present invention to a dispensing container for medicaments.

FIG. 5 illustrates the adaptability of the peelable seal 61 for use in packaging such articles as medicaments 62 wherein individual compartments are formed in the container 60 so as to permit easy access when required by peeling the edges of each compartment by the application of a peeling force with free end tabs 63, 63'. The compartments may be formed by the selective heat sealing of two films or alternately, by heat sealing a plurality of films over a single film.

Figure 6:
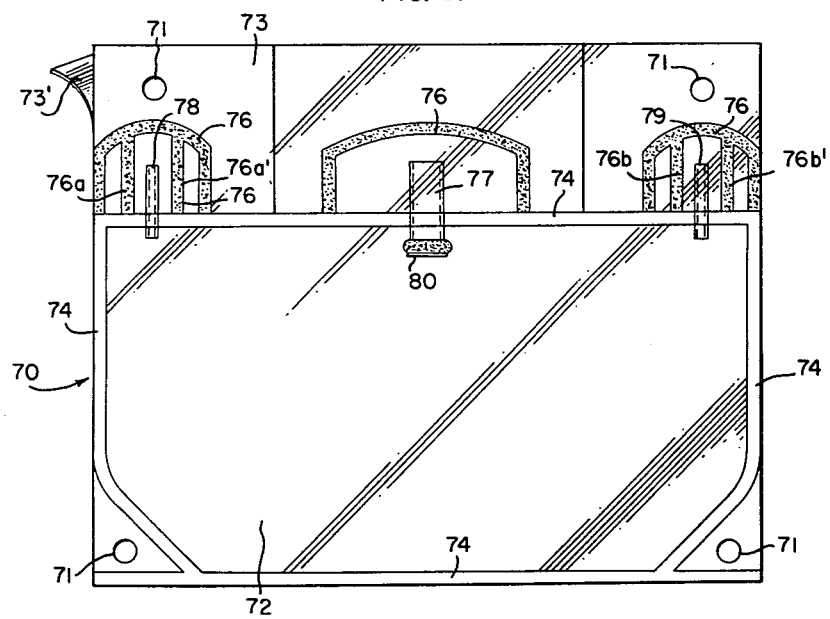
FIG. 6 illustrates the application of the present invention to a blood storage bag.

Turning now to FIG. 6, there is shown a sterilizable, flexible polyethylene bag 70 with hopes 71 for hanging the bag either in an upright or in an inverted position. Bag 70 also includes a first hollow outward protrusion 77, welded onto said bag, a second hollow outward protrusion 78 such as for use in introducing plasma into the bag, and a third hollow protrusion 79, such as for introducing platelets into the bag, formed at the upper periphery of the bag. Along the periphery of the bag is provided a weld seal 74. Further, each of the protrusions 77, 78 and 79 is provided with a protective closure which forms a bag and is provided with tabs 73, 73'. Each of the bag portions over the protrusions is formed by means of a weld seal 74 at its base and by a peelable seal between the base portion and the tab or free end portions 73, 73'. The tab portions 73, 73' serve as a gripping means for opening the peelable seal.

It has been further found to be advantageous to provide a peelable seal in a platelet bag close to the plasma inlet 78 and platelet inlet 79 as illustrated by 76a, 76a' and 76b, 76b'. By providing the seal close to the tubes 78 and 79, there is created an air pressure which prevents the occurrence of flow due to capillary action if only one of the inlets 78 or 79 is utilized. Optionally, after utilization, the bag may be re-sealed below the inlets. Also, to prevent flow of material into tube 77, a puncturable membrane 80 is provided.

An advantage of the present blood storage bag also lies in that plastic sheets of the same material and thickness are used for both the bag and the protective closure; the seal is unfailingly peeled open and the joint of the protective closure and the seal around the inlets act as a stopper.

In connection with maintaining sterility, since the protective closure is peeled in such a way as described, there is little possibility that germs sticking to the tab or protective closure fall into the port as the tab is turned over. Also, with the peelable seal there is an insurance of the integrity of the seal until the bag is utilized.

The ports may also include a ridge or spherical enlargement on its outer diameter so as to provide a convenient and simple means for adapting the bag to any of a variety of blood storage applications, including the storage of various blood components and the freeze storage of red blood cells.

It is understood that the present invention may be utilized in connection with other blood pack systems such as in the collection, preparation, storage or administration of whole blood or blood components.

It is further understood that the term "weld seal" as used herein refers to either a peelable seal of high strength or a weld seal.

While this invention has been described with respect to specific embodiments thereof, it should be understood that this invention is not limited to those embodiments and that the appended claims are intended to include these and other features and embodiments as may be devised by those skilled in the art which are nevertheless within the spirit and scope of this invention.

I claim:

1. A peelable seal which is formed with at least two extruded polyolefin film members by the simultaneous application of controlled heat and pressure to said film members at the portion to be sealed, wherein at least one surface of at least one of the polyolefin film members at the portion to be sealed is oxidized by treatment with corona discharge so that the surface crystals formed by extrusion are modified whereby the simultaneously applying of controlled heat and pressure softens the modified crystals at the contacting surface to partially fuse the crystals at the contacting surface while maintaining the integrity of the crystals, and the modified crystals form an interface between the polyolefin film members at the seal portion.

2. The peelable seal according to claim 1, wherein said treated polyolefin film members are subjected to pressure of about 500–1500 psi of sealing area and sealing is conducted at a temperature of about 200°–500° F.

3. The peelable seal according to claims 1 wherein said polyolefin is polyethylene.

4. The peelable seal according to claim 1 wherein said polyolefin film members are sealed across the opening of a container.

5. A flexible container comprising a polyolefin film and a peelable seal according to claim 1 said container having a substantial portion of its periphery weld sealed.

6. The container according to claim 5 wherein said polyolefin is polyethylene.

7. The container of claim 6 having a plurality of peelable portions of different peel strengths.

8. A sterilizable, closed container including an inlet at the top thereof forming a part of said closed container, said inlet being composed of a peelable seal according to claim 1.

9. A packaging unit comprising polyolefin films having an oxidized surface sealed together at selective portions of said films so as to form compartments, the seal portions comprising a peelable seal according to claim 1 so as to remove an article within a single compartment.

* * * * *